UNITED STATES PATENT OFFICE.

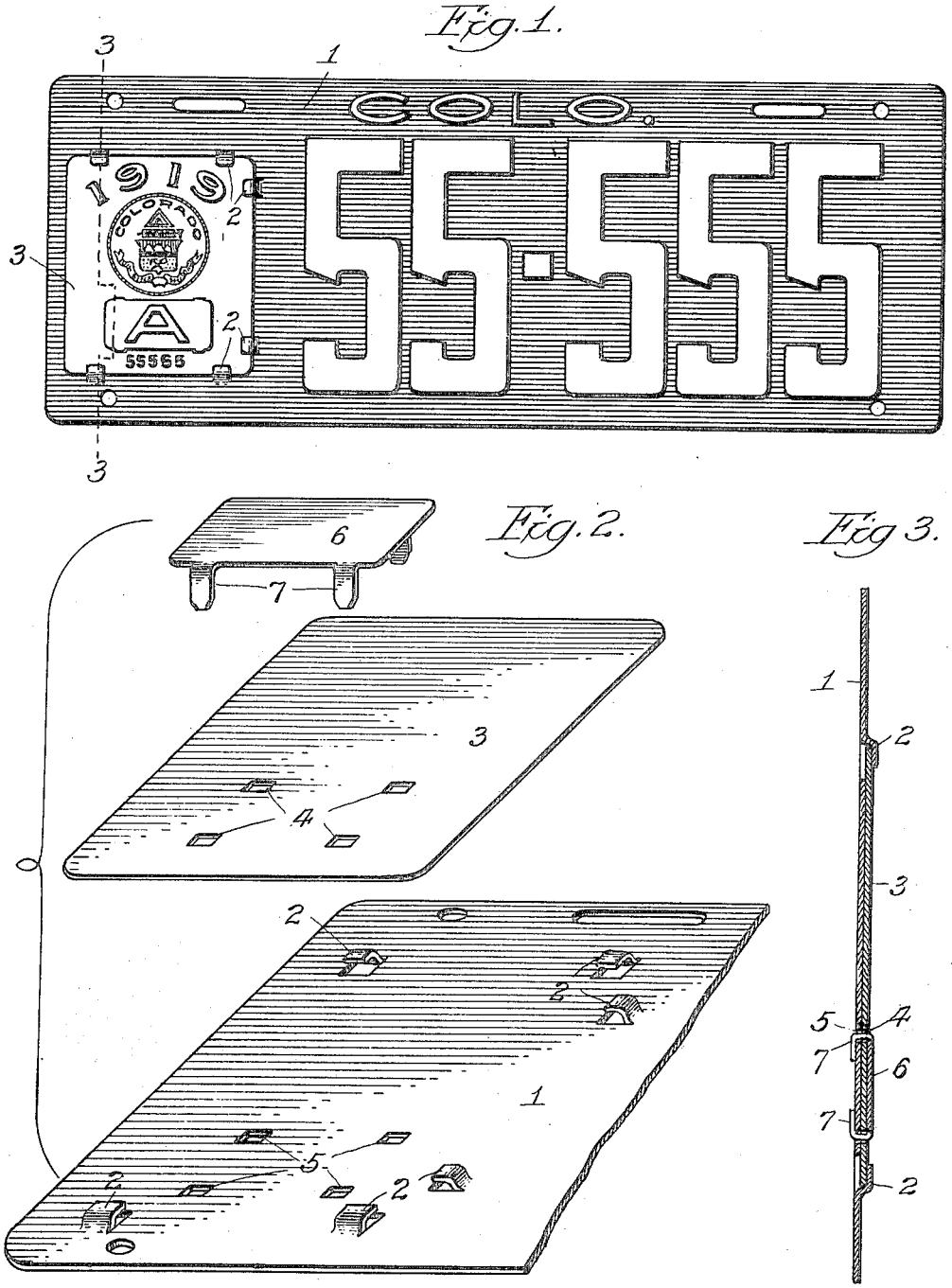

RUDD HARDESTY, OF DENVER, COLORADO.

PERPETUAL AUTOMOBILE LICENSE-PLATE.

1,384,949.  Specification of Letters Patent.  Patented July 19, 1921.

Application filed October 10, 1918. Serial No. 257,549.

*To all whom it may concern:*

Be it known that I, RUDD HARDESTY, a citizen of the United States, residing at Denver, in the county of Denver and State of Colorado, have invented a new and useful Perpetual Automobile License-Plate, of which the following is the specification.

This invention relates to a new and useful perpetual license plate, and has for its object the provision of a device of that class, simple, durable and efficient in construction; it is a further object to provide a perpetual plate of this class, with means for indicating the year and class of vehicle for which the license is issued, which means can be readily removed and replaced without destroying the plate.

The above and other features of advantages and capabilities will become apparent from a detailed description of the accompanying drawings, in which I have illustrated a perpetual license plate embodying one form of my construction, but the construction there shown is to be understood as illustrative only, and not as defining the limits of my invention.

Figure 1 is a plan view of a license plate with a removable supplemental plate secured in place, carrying characters indicating the year, State for which the license is granted, price of the license and number.

Fig. 2 is a detailed perspective view of a portion of the main plate, showing the supplemental plate, and means for attaching to the main plate removed therefrom, and Fig. 3 is a vertical cross-sectional view of the main plate substantially on the line 3—3 of Fig. 1.

Referring to the drawings in detail, the main plate 1, which usually carries the characters indicating the State for which the license is granted, and the number of the license, is provided near one end with lugs 2, which are struck up from the plate as best shown in Fig. 2. The supplemental plate 3 is of sufficient size to fit properly within the lugs 2 on the main plate 1, and is slid in from the side. This supplemental plate 3 is provided with a series of openings 4, which register with the openings 5 in the main plate when the supplemental plate has been slid home, in which position it is held by the clip 6, which is provided with tongues 7, designed to pass through the registered openings in the supplemental and main plates and bend over on the under side, as best shown in Fig. 3. The parts are all constructed of metal, and the indicating characters on both the main and supplemental plates embossed thereon, or otherwise properly fixed thereto. The main plate is used from year to year by the owner carrying the same number for his license, but the supplemental plate may be removed and replaced each year, or whenever desired, which supplemental plate carries a character indicating the year for which the license is granted, a character indicating the State, city or territory for which it is granted, and a character indicating the price of the license, which is a very important feature as it readily detects the use of a license on a car other than the grade for which it was granted. To bring out more clearly this feature, the price of the annual license in most States depends on the horse power of the car, ranging, say for example, from $10 down to $2.50. It frequently occurs that one owning a high power car would represent it to be a Ford or some other cheap car, secure a license for $2.50 and put it on a high power car, and after doing so one would not be able on inspection to determine from the license plate used the price of the license or the grade of car for which it was issued, but with my invention, by having some symbol or character, such as A, B, C, D, etc., to indicate the different prices paid for licenses, the user is then unable to use a license secured for a cheap car on a high power car, without being readily detected from an inspection of the plate. This also has the further advantage of enabling an inspector to easily and quickly check up a car on which the license has not been fully paid. The supplemental plate also carries numbers, symbols or characters corresponding with the number on the main plate. If an owner secured one of these perpetual license plates for a cheap car at a license of $2.50, which license was good for a year, then shortly thereafter and before the year expired obtained a higher powered car, he could use the same perpetual plate for the higher priced car, by simply obtaining a small clip with the proper price indicating character or symbol thereon, and substitute it for the one formerly thereon, without in any way removing the supplemental plate or the main plate from the place where used.

Having now described my invention, I claim:

1. A perpetual automobile license plate comprising a permanent main plate having thereon characters indicating the license number and State, a smaller year plate adapted to be attached thereto and having thereon characters indicating the license number, license period and State, and a third plate having thereon characters, indicating classification of the automobile, said third plate having means to co-act with said main plate and said smaller year plate to removably hold the three plates in fixed relation with respect to each other.

2. A permanent license plate in combination with a year plate and interchangeable means to coöperate with said year plate to indicate different classifications of the object licensed, said interchangeable means being removably held in fixed relation to said year plate and holding said permanent and year plates in fixed position.

In witness whereof, I hereunto subscribe my name to this specification in the presence of two witnesses.

RUDD HARDESTY.

Witnesses:
J. V. RUSH,
H. F. GLENN.